US009247595B2

(12) United States Patent
Fornage et al.

(10) Patent No.: US 9,247,595 B2
(45) Date of Patent: Jan. 26, 2016

(54) LED LIGHTING CONVERTER (71) Applicant: Enphase Energy, Inc., Petaluma, CA (US)

(72) Inventors: Martin Fornage, Petaluma, CA (US); Michael Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 14/291,550

(22) Filed: May 30, 2014

(65) Prior Publication Data
US 2014/0361703 A1    Dec. 11, 2014

Related U.S. Application Data (60) Provisional application No. 61/833,583, filed on Jun. 11, 2013.

(51) Int. Cl.
*H05B 37/02* (2006.01)
*H05B 33/08* (2006.01)

(52) U.S. Cl.
CPC ........ *H05B 33/0815* (2013.01); *H05B 33/0821* (2013.01)

(58) Field of Classification Search
USPC ............. 315/200 R, 201, 205, 224, 225, 274, 315/276, 294, 297, 307
See application file for complete search history.

(56) References Cited

U.S. PATENT DOCUMENTS

| | | | |
|---|---|---|---|
| 7,920,391 B1 | 4/2011 | Vinciarelli | |
| 2002/0191428 A1 | 12/2002 | Loef | |
| 2009/0021175 A1* | 1/2009 | Wendt et al. | 315/200 R |
| 2009/0273301 A1* | 11/2009 | De Anna | H05B 33/0815 315/294 |
| 2010/0052566 A1* | 3/2010 | Kitamura | H05B 33/0815 315/291 |
| 2010/0109571 A1 | 5/2010 | Nishino et al. | |
| 2010/0237799 A1* | 9/2010 | Choi et al. | 315/294 |
| 2011/0002445 A1 | 1/2011 | Hattrup et al. | |
| 2012/0014152 A1 | 1/2012 | Nakamura et al. | |
| 2012/0242239 A1* | 9/2012 | Miskin et al. | 315/201 |

OTHER PUBLICATIONS

PCT Search Report and Written Opinion, PCT/US2014/040517, 13 Pages, Mailed on Sep. 24, 2014.

* cited by examiner

*Primary Examiner* — Tung X Le
(74) *Attorney, Agent, or Firm* — Moser Taboada (57) ABSTRACT A method and apparatus for light emitting diode (LED) lighting power conversion including a full bridge rectifier circuit coupled to a first half-bridge rectifier circuit and a resonant tank circuit supplying AC power to a LED circuit and forming a first port to the LED circuit. The apparatus further includes a second half-bridge rectifier circuit and energy storage device receiving and supplying DC power to the LED circuit as determined by a controller to form a second port of the LED circuit, wherein the LED circuit further comprises a rectifier circuit for the LED circuit, and at least one LED.

19 Claims, 5 Drawing Sheets

LED LIGHTING CONVERTER

CROSS-REFERENCE TO RELATED APPLICATION

This application claims priority to U.S. Provisional Patent Application No. 61/833,583 filed on Jun. 11, 2013, which is incorporated by reference herein in its entirety.

BACKGROUND OF THE INVENTION

1. Field of the Invention

Embodiments of the present disclosure relate generally to power conversion and, in particular, for converting power for LED lighting.

2. Description of the Related Art

Light emitting diodes (LEDs) provide many advantages over other types of artificial lighting (e.g., incandescent, compact cold-cathode fluorescent lamps (CCFLs), fluorescent, and the like). Such advantages may include low power consumption, compact size, low heat generation, and long operating lifetime.

LED lighting requires consistent direct current (DC) power to operate, and is typically generated by converting alternating current (AC) that is generally available from a conventional power grid. AC to direct current (DC) conversion may require expensive and complex multistage conversion components to prevent deterioration of LEDs. In addition, after a sufficient forward voltage (e.g., 3 volts), LEDs may be viewed as current driven devices such that the luminosity of a LED is directly determined by the amount of applied current. But as a by-product of AC conversion, a residual ripple voltage and current contributes to inconsistent DC power and a perceptible visual flicker of LEDs. The flicker is most noticeable during movement of objects in the generated light causing a stroboscopic effect.

Thus, there is a need for a circuit capable of generating consistent DC power for LED lighting with reduced ripple current and voltage.

SUMMARY OF THE INVENTION

Embodiments of the present invention generally relate to a method and apparatus for a LED lighting power converter. Specifically, the power converter is operable to reduce noticeable visual flicker of lighting LEDs substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention are operative to reduce flicker in LED lighting by supplying DC power with reduced ripple current and voltage through a AC to DC power converter. With several operating modes, the converter comprises multiple ports and an energy storage device that is selectively charged or discharged to supply smooth DC power to LED lighting.

Figure 1:
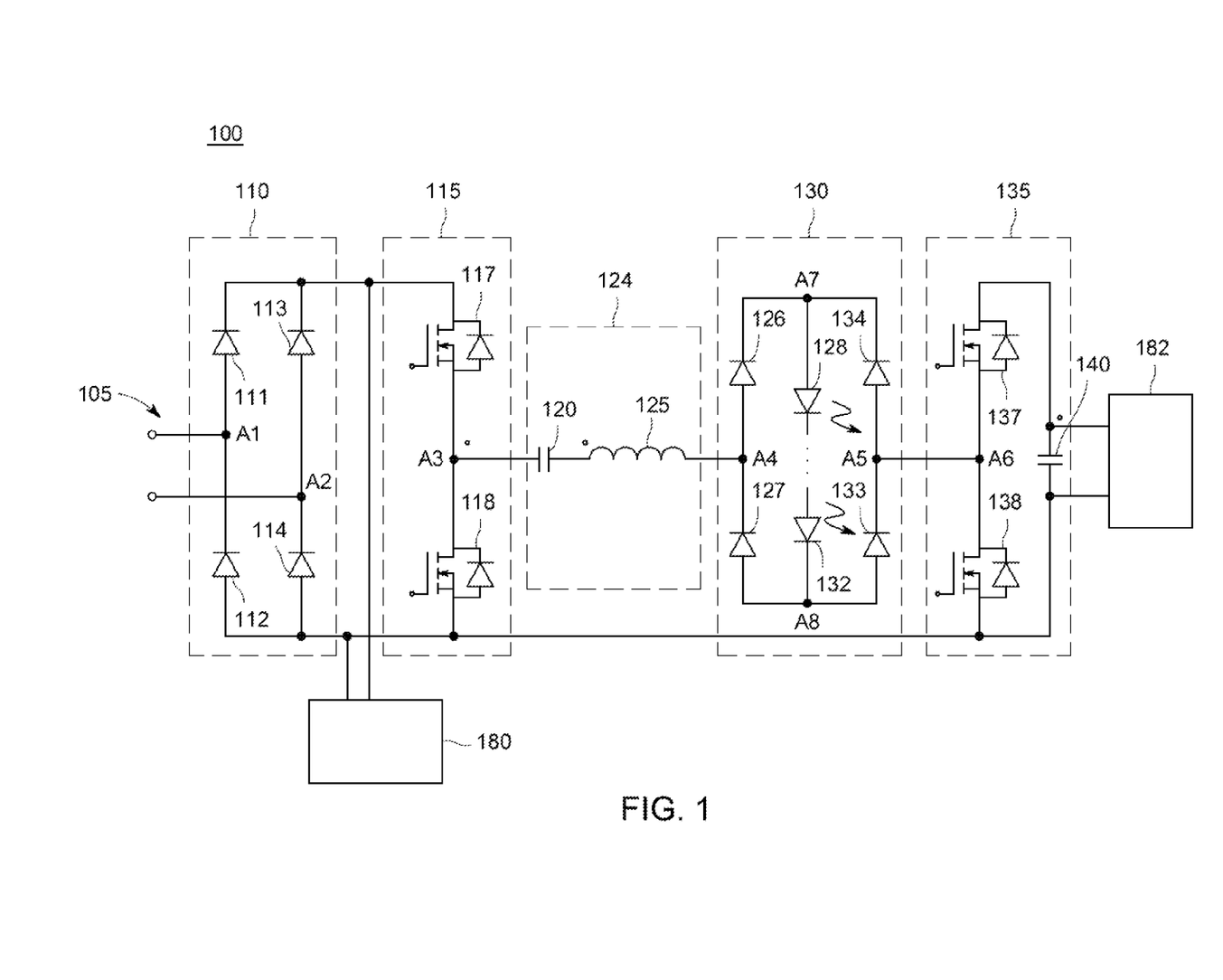
FIG. 1 is a schematic diagram of an exemplary transformerless LED lighting converter in accordance with one or more embodiments of the present invention.

FIG. 1 is a schematic diagram of a transformerless LED lighting converter 100 in accordance with one or more embodiments of the present invention. The converter 100 is controlled by controller 190 such that LEDs (128, 132) receive consistent DC power to substantially eliminate perceptible flicker. The converter 100 comprises an AC input 105, a full-bridge rectifier circuit 110, a first half-bridge circuit 115, a resonant tank circuit 124, a LED circuit 130, and a second half-bridge circuit 135. The converter 100 is comprised of switches depicted as transistors (e.g., n-type metal-oxide-semiconductor field-effect transistors, or MOSFETs).

Figure 3:
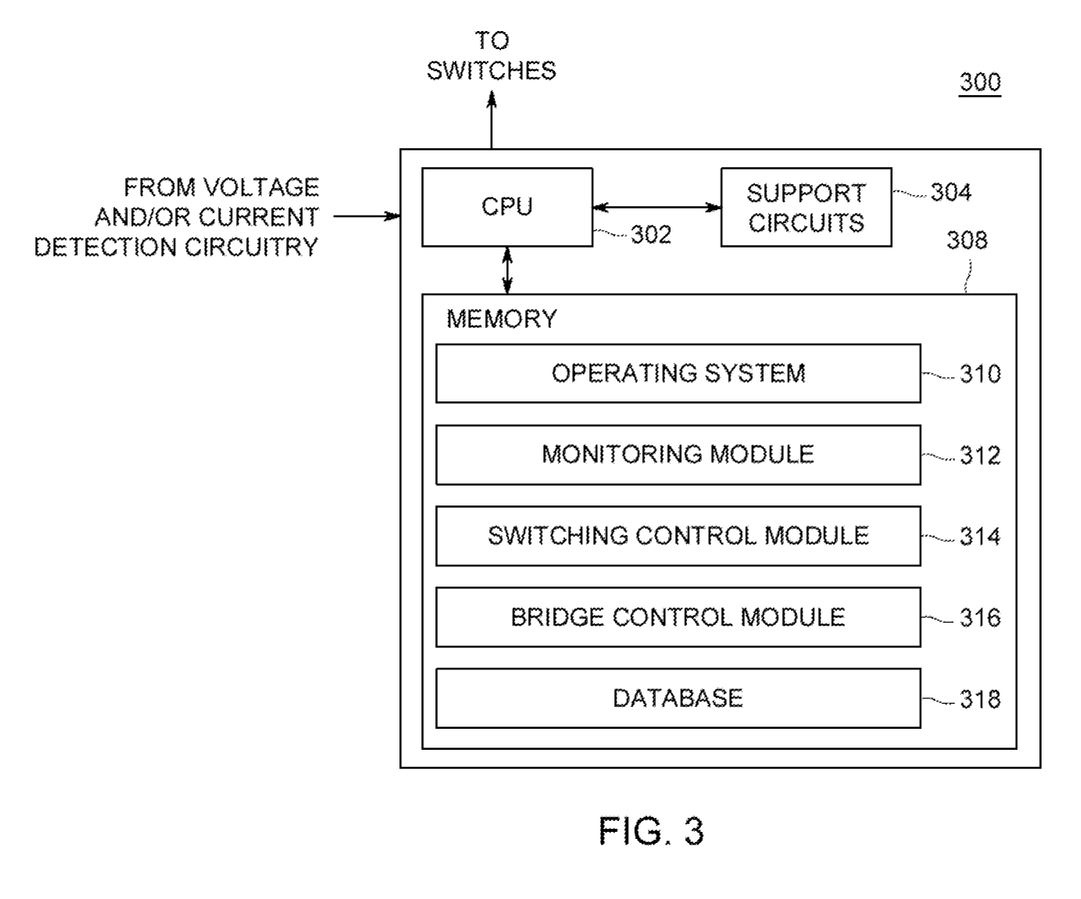
FIG. 3 is a block diagram of an exemplary controller in accordance with one or more embodiments of the present invention.

The converter 100 operates in several operating modes. Execution of the operating modes is described in greater detail with respect to FIG. 3 depicting an exemplary controller that coordinates operations of switches 117, 118, 137, and 138 to implement the various modes. The switches 117 and 118 coupled in series form a left-hand side (LHS) totem pole and serially coupled switches 137 and 138 form a right-hand side (RHS) totem pole.

In some embodiments, the AC input 105 is coupled to the AC grid or other AC source. Each leg of the AC input 105 is coupled to nodes A1 and A2. Nodes A1 and A2 are each respectively located between a pair of series connected diodes (111/112 and 113/114) to form the full-bridge rectifier 110. The full bridge rectifier 110 is coupled to a pair of series connected switches or transistors (117 and 118) comprising the first half-bridge circuit 115. In some embodiments, where the AC source is 60 Hz, the full-bridge rectifier circuit 110 outputs a power waveform at 120 Hz. Subsequently, the first half-bridge circuit 115 outputs a substantially square wave at 120 kHz. In such an embodiment, the square wave of about 120 kHz is amplitude modulated to produce a 120 Hz envelope.

The first half-bridge circuit 115 is then coupled via node A3 to the resonant tank circuit 124 comprised of capacitor 120 and inductor 125 coupled in series. The resonant tank circuit 124 is designed to resonate at a particular center frequency (e.g., 100 kHz, 120 kHz, and the like) as determined by the value of the capacitor 120 and inductor 125. The switching frequency of the half-bridge circuits 115 and 135 determines whether the resonant tank circuit 124 is to resonate near or away from the resonant center frequency. For example, when the switching frequency matches the peak resonant point, there is maximum power transfer, while operating above or below the peak, there is less current. Varying the switching frequency of switches 117, 118, 137, and 138 thus controls the amount of power coupled to the LED circuit 130.

The inductor 125 is further coupled to the LED circuit 130 via node A4, located between a pair of rectifier diodes (126 and 127). Rectifier diodes (126, 127, 133, 134) rectify the power from the resonant tank circuit 124 (e.g., at 120 kHz) and from the second half-bridge circuit 135. The rectifier diodes (126, 127, 133, 134) output a high frequency pulse (e.g., 240 kHz) resulting in a substantially DC power supply to lighting LEDs 128 and 132 across nodes A4 and A5.

In some embodiments, the rectified signal from the resonant tank circuit 124 is inversely compensated for by power output from the capacitor 140 (e.g., the first operating mode). Although the depicted embodiment in FIG. 1 comprises two LEDs (e.g., 128, 132) across nodes A7 and A8, alternative embodiments may be implemented with a different multiple of LEDs or a string of LEDs. In some embodiments, the 240 kHz ripple voltage may be filtered by the inductance of the physical layout in the LED circuit 130.

The second half-bridge circuit 135 is coupled to the LED circuit via nodes A5 and A6. Node A6 is located between a pair of half-bridge transistors (137 and 138). In some periods, the transistors (137 and 138) allow power from the LED circuit 130 to charge the storage capacitor 140. In other time periods, the pair of half-bridge transistors (137 and 138) invert DC voltage from a storage capacitor 140 to be rectified in the LED circuit 130. In such periods, the power from the storage capacitor 140 compensates power input from the resonant tank circuit 124 such that nodes A7 and A8 receive a pulse train substantially similar with that consistent of DC power. The compensated power substantially eliminates the ripple voltage and current that leads to perceptible LED flicker. In some embodiments, the ripple is a residue from the converter power from first half-bridge circuit 115, tank circuit 124, or AC source 105.

Thus, nodes A4 and A6 operate as energy ports for the input of power to the LEDs located across nodes A7 and A8. Node A6 also operates as a bi-directional energy port for the LEDs (128, 132) that may input to or output power from the LED circuit 130. The operation of the ports is determined by a controller 190 coupled to the transistors (117, 118, 137, 138). The depicted four transistors (117, 118, 137, 138) are thereby switched to control the input and output currents to the LED circuit 130. The second half-bridge circuit 135 effectively operates as a secondary power source for the LED circuit 130 to supply power to the LEDs (137 and 138) in conjunction with the input from the resonant tank circuit 124 to produce a high frequency pulse consistent with that of DC power at nodes A7 and A8 by changing switching frequencies and/or phase shifting the switching times of transistors (117, 118, 137, 138).

The efficiency of the converter 100 and bridge circuits (e.g., 115, 135) in a single phase application is readily apparent as the converter 100 must store energy for a single half main cycle (e.g., in a 60 Hz system, about 4 ms). Such examples for single phase conversion are herein incorporated by reference in their entirety and may be found in commonly assigned issued patent application U.S. Patent App. 2012/0170341 entitled "Method and Apparatus for Resonant Power Conversion" filed Jan. 3, 2012.

Voltage detectors 180 and 182 are included within the converter 100 to measure voltage and coupled to a controller (not shown) to calculate current for controlling bridge switches 117, 118, 137, 138. Voltage detector 180 is coupled to measure voltage at the output of full bridge rectifier circuit 110, and voltage detector 182 is coupled across storage capacitor 140. The detectors 180 and 182 provide measurement data for synchronizing to the AC port 105. For example, the actual instantaneous power flow in (or out) of the storage capacitor 140 is controlled to follow a sine wave profile such that the power drawn from the AC source (coupled to AC port 105) is at a unity power factor.

In other embodiments, monitoring of the AC side is achieved by sampling voltage from a voltage detector 180 (e.g., voltage from the drain of switch 117 to source of switch 118) and DC side voltages at detector 182, and current of the resonant inductor 125 may provide sufficient data to the controller for operating a control loop for the converter 100. Additional alternative embodiments include voltage measurements may be made across the LEDs 128 and 132 or optical sensors for detecting LED flicker and control through a feedback loop. Further embodiments may monitor the AC source voltage for controlling the switches 117, 118, 137, and 138.

The bridge switches 117, 118, 137, 138 are controlled to alternate between operating modes as well as change in frequency to control the amount of current flowing through the tank circuit 124. The controller (not shown) may change the switching frequency of the two half-bridge circuits 115 and 135. The switching frequency subsequently modifies the effective impedance of the resonant tank circuit 124 and controls the amount of current input or output into the LED circuit by shifting the operating frequency with respect to the resonant frequency of the resonant tank circuit 124. In some embodiments, the diagonally coupled transistors (117/138) are ON and opposing transistors (118/137) are OFF. Alternatively, the switching signals may introduce a phase shift during times where both transistors (117/137 and 118/138) are ON or OFF within the same period. Further embodiments may include photo-sensors or current detectors to ensure LED flicker is eliminated via a feedback loop with the controller to adjust the switching frequency and power to the LEDs based on the detected flicker. Such embodiments may further include predefined algorithms for operation of the feedback.

Figure 2:
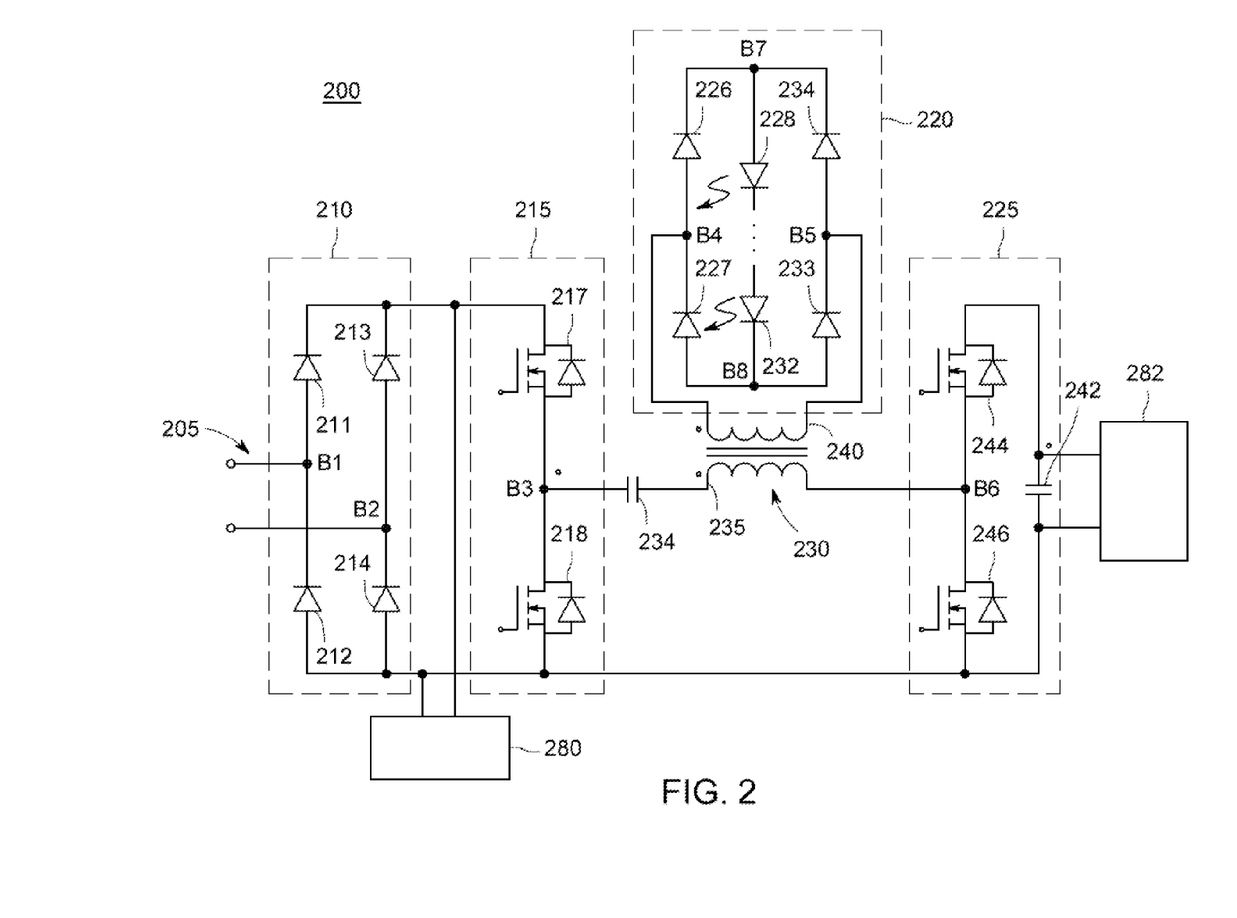
FIG. 2 is a schematic of a LED lighting converter in accordance with one or more embodiments of the present invention.

FIG. 2 is a schematic of a LED lighting converter 200 in accordance with one or more embodiments of the present invention. The lighting converter (hereinafter, referred to as converter) 200 is similarly implemented via the aforementioned controller described with respect to FIG. 1. The forward operating voltage of a LED is comparatively low (e.g., 3 volts) considering the typical input AC outlet voltage (e.g., 120VAC), and lowering the conversion ratio between the LED voltage and the input voltage allows efficient conversion. The converter in 200 utilizes a transformer 230 to decrease the power conversion ratio between the input voltage and voltage for the LEDs to accommodate for a greater voltage difference.

The converter 200 comprises an AC input 205, a full-bridge rectifier circuit 210, a first half-bridge circuit 215, the transformer 230, a LED circuit 220, and a second half-bridge circuit 225. Voltage sensor 280 is coupled to the output of the full-bridge rectifier circuit 210, and voltage sensor 282 is across storage capacitor 242 for measuring power on the AC side and DC side respectively, of the converter 200. Alternatively, voltage measurements may be sampled at the input port 205 or across the LED circuit 220. The converter 200 similarly uses a controller and voltage detectors similarly discussed in converter 100 for controlling switches in the converter 200.

Each leg of the AC input 205 is coupled to nodes B1 and B2. Nodes B1 and B2 are respectfully each located between a pair of series coupled diodes (211/212 and 213/214) to form the full-bridge rectifier 210. The full bridge rectifier 210 is coupled to a pair of series coupled switches or transistors (217 and 218) comprising the first half-bridge circuit 215.

The first half-bridge circuit 215 is then coupled via node B3 to a resonant capacitor and a primary winding 235 of transformer 230. The distal end of the primary winding 235 is coupled to the second half-bridge circuit 225 at node B6. The second half-bridge circuit 225 comprises node B6 located between two serially connected switching transistors (244 and 246) coupled across a storage capacitor 242. The switching transistors (244 and 246) are controlled to either discharge the storage capacitor 242 to supply power to the LED circuit 220 or charge the storage capacitor 242.

A secondary winding 240 of the transformer 230 is coupled to the LED circuit 220 via nodes B4 and B5. Nodes B4 and B5 are respectively coupled between two serially connected rectifying diodes (226/227 or 233/234). The cathodes of the rectifying diodes coupled to node B7 and LEDs (228, 232). Although the depicted embodiment in FIG. 2 comprises two LEDs (e.g., 228, 232) coupled across nodes B7 and B8, alternative embodiments may be implemented with a different multiple of LEDs. Nodes B4 and B5 collectively supply power to the rectifier circuit comprised of diodes 226, 227, 233, and 234 in the LED circuit 220.

The depicted embodiment in FIG. 2 comprises the transformer 230 to isolate the LED circuit 220 from the large input voltage from the AC input 205 and subsequently at node B3. The transformer 230 aides in matching the input voltage at node B3 and B6 to the required operating voltage of the LED circuit 220 at node B4 to reduce the voltage ratio and increase efficiency. For example, if the input at node B3 is of 120V and the LED 228 has a forward operating voltage of 3V, the transformer 230 would have a turns ratio of 10:1 to step the voltage down to a reasonably lower input voltage across nodes B4 and B5 for the LEDs (228, 232) of the LED circuit 220.

Thus, the aforementioned embodiments of the converter 200 may be more suitable for embodiments with few LEDs (e.g., one or two) with relatively high voltage conversion ratios as compared to converter 100 that may have multiple LEDs and a lower conversion ratio. As similarly described above with respect to FIG. 1, the converter 200 is controlled by controller 190 such that the second half-bridge circuit 225 operates as a secondary power source for the LED circuit 220. The controller 190 controls the operating order and frequency of the transistors (217, 218, 244, 246) to ensure an input pulse train resembling power consistent with that of constant DC power at node B7 for powering the LEDs (228, 232).

FIG. 3 is a block diagram of an exemplary controller 300 in accordance with one or more embodiments of the present invention. The controller 300 operative to control the switches in converters 100 and 200 discussed above. For ease of discussion, FIG. 3 will be described with respect to converter 100 but one skilled in the art recognizes the controller 300 may equally operate for control of converter 200.

The controller 300 comprises a CPU/processor 302, support circuits 304, and memory 308 containing instructions and algorithms. The CPU 302 processing inputs and outputs to the transistors/switches 117, 118, 137, and 138. The CPU 302 may be any commercially available processor, microprocessor, microcontroller, and the like. In other embodiments, the CPU 302 is a microcontroller such as a PIC. The support circuits 304 comprise well known circuits that provide functionality to the CPU 302 such as clock circuits, communications, cache, power supplies, I/O circuits, and the like. Other embodiments may include external communications (i.e., gateway) and a grid interface. Alternative embodiments may use control algorithms on a custom Application Specific Integrated Circuit (ASIC).

The memory 308 may be any form of digital storage used for storing data and executable software. Such memory includes, but is not limited to, random access memory, read only memory, disk storage, optical storage, and the like. The memory 308 stores computer readable instructions corresponding to: a monitoring module 312, switching control module 314, and a bridge control module 316. Additional embodiments may include an operating system 310 for facilitating communication between the CPU 302 and memory as well as one or more databases 318 stored in memory 308.

The monitoring module 312 receives the voltage and current detection measurements from voltage and current detection circuits. The monitoring module 312 converts the analog measurements to digital data. In alternative embodiments, the converter 100 may include A/D converters coupled to the detection circuits. The monitoring module 312 passes digital measurement data to the switching control module 314 and bridge control module 316.

The switching control module 314 controls the switching frequency of respective switches in the converter 100 and current flow from the AC port 105. By operating the switches at a frequency beyond the resonant peak, the load is operatively inductive and converter 100 operates with zero voltage switching (ZVS) commutations. Increases in switching frequency by the switching control module 314 shifts operation away from the resonance peak of the tank circuit 124 and in turn reduces tank circuit 124 output voltage (and hence current) relative to the input voltage.

Based on the measurements, the bridge control module 316 controls operation of the switches 117, 118, 137, and 138 in a controls scheme that may be represented as one of four modes as well as transitions between the operating modes across consecutive time periods. The first operating mode supplies power to the LED circuit 130 from both the AC source coupled to the AC port 105 and storage capacitor 140. In the third operating mode, diagonal devices are alternately in the ON position. Thus, in a first state switches 117 and 138 are ON when switches 118 and 137 are OFF. Similarly, a second state includes switches 117 and 138 are OFF when switches 118 and 137 are ON.

The second operating mode transfers power to charge the storage capacitor 140 from the AC port 105. In the second operating mode, in one state switches 117 and 137 are ON while switches 118 and 138 are OFF. In a second state, switches 117 and 137 are OFF while switches 118 and 138 are ON.

In some embodiments, the first and second modes represent extremes of a control scheme spectrum determined by controlling the phase shift between the switching signal provided to a LHS totem pole (i.e., switches 117 and 118) and RHS totem pole (e.g., switches 137 and 138). In the first mode, the LHS and RHS control signals (e.g., gate signals) are 180 degrees out of phase. In the second mode, the LHS and RHS totem poles are driven in-phase with one another. Thus, by varying the phase shift between 0 to 180 degrees, the relative amount of power flow into or out of the storage capacitor 140 can be controlled.

In embodiments wherein the AC source is the AC grid mains, the energy flow must be balanced over a single mains cycle. To achieve this, sine wave current drawn from the mains (e.g., at AC port 105) must be in-phase with the mains voltage (i.e., a unity power factor). For the half of the mains cycle that the instantaneous power flow will be greater than the cycle average power flow, there is a net transfer of power from the AC input to the storage capacitor 140 and for the other half of the mains cycle that the instantaneous power flow will be less than the cycle average power flow there is a net drain of power from the storage capacitor 140. The actual instantaneous power flow into or out of the storage capacitor 140 is controlled to follow a sine wave profile such that the power drawn from the AC source is at a unity power factor by the controller 300.

The third operating mode supplies power to the LED circuit 130 from only from the AC source (not shown) coupled to the AC input 105. In the third operating mode, switches 117 and 118 are alternated while switches 137 and 138 are held in opposite positions. For example, while switches 117 and 118 are toggling, switch 137 is held ON and switch 138 is held OFF or switch 137 is held OFF and switch 138 is ON.

The fourth operating mode supplies power to the LED circuit 130 exclusively from energy stored in a storage capacitor 140. To supply power exclusively from the storage capacitor, switches 137 and 138 are toggled in an alternating pattern while either switch 117 or 118 are held in a respective static ON and OFF state. Thus, while switches 137 and 138 are alternating, switch 117 is held ON and switch 118 is held OFF or switch 117 is held OFF and switch 118 is held ON.

The four operating modes may be used in conjunction with one another or alternatively, paired off depending on the operating requirements. As discussed above, for unity power factor operation, the first and second operating modes may be alternated. If non-unity power factors are required, the third and fourth operating modes may be implemented to supply power to the LED circuit 130. The third and fourth operating modes representing an instantaneous operation extreme in a control scheme incorporating multiple operating modes.

Figure 4:
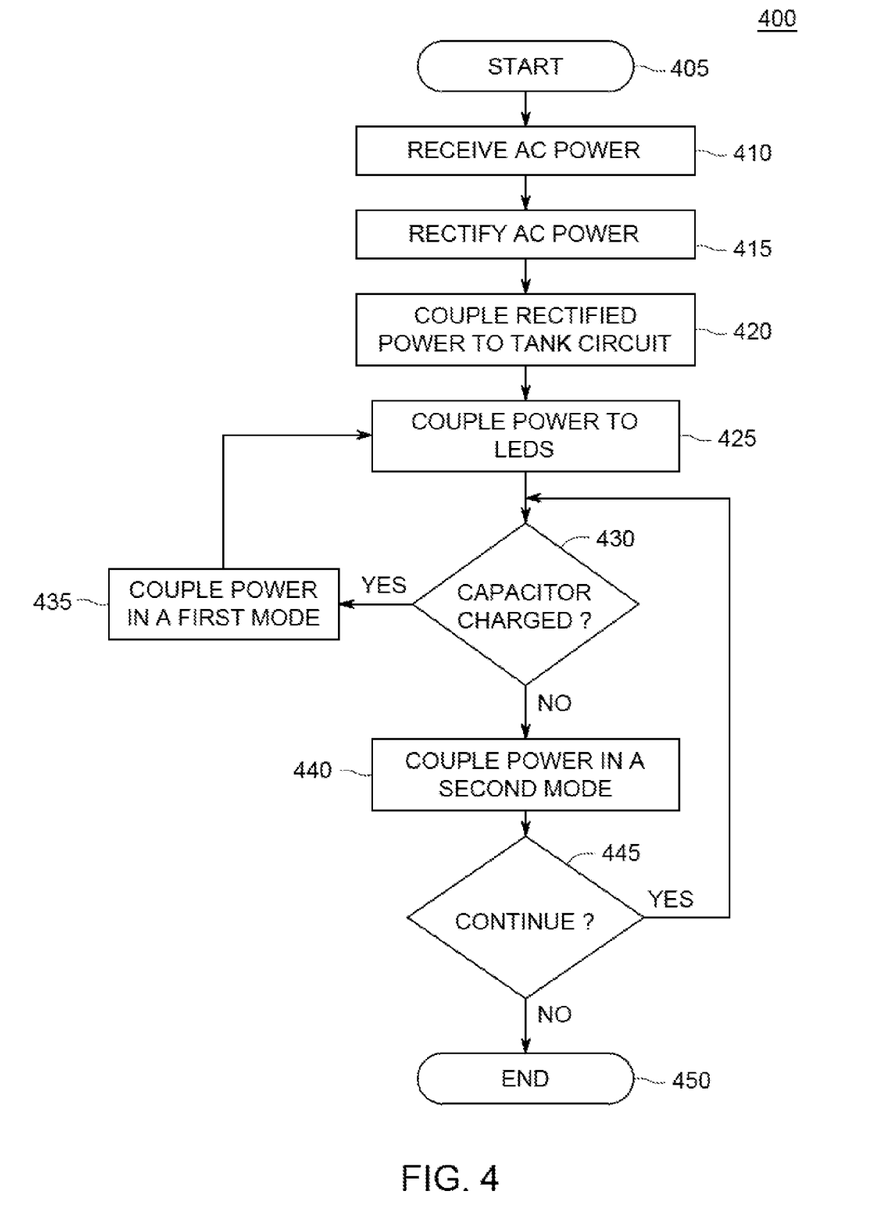
FIG. 4 is a flowchart of an exemplary method in accordance with one or more embodiments of the present invention.

FIG. 4 is a flowchart of an exemplary method 400 in accordance with one or more embodiments of the present invention. The method 400 implemented by either converter 100 or 200 described above with the controller 300 or other electronic control logic. For ease of explanation, the method 400 will be described with respect to converter 100, however one skilled in the art would comprehend the method 400 similarly applies to converter 200.

The method begins at step 405 and continues to step 410. At step 410, AC power from an AC source (e.g., the commercial AC grid) is received at an input port 105 of the converter.

Next, at step 415 the AC power is rectified into a substantially square wave. In some embodiments, rectification is achieved through a rectifier circuit (e.g., full bridge rectifier circuit 110) comprising diodes or transistors.

At step 420, the rectified power is coupled to a tank circuit 124. In some embodiments, input to the tank circuit 124 is controlled by a bridge circuit (e.g., half-bridge circuit 115) comprising at least one pair of switches (e.g., switches 117 and 118). Control of the switching frequency of the bridge circuit 115 determines the amount of output power from the tank circuit.

At step 425, power is coupled to illuminate the lighting LEDs (e.g., LED circuit 130). In some embodiments, excess power not coupled to the lighting LEDs is also coupled to charge an energy storage device (e.g., storage capacitor 140).

Next, at step 430, the method 400 determines whether the storage capacitor 140 is charged. The charging threshold in some embodiments, is a voltage that is greater than the peak voltage of the AC input mains or AC port 105 (e.g., 400 VDC for a 230 VAC mains system). In other embodiments, the capacitor threshold is a fully charged capacitor.

In some embodiments, the voltage across the storage capacitor is measured using voltage detection circuitry. In such embodiments, a predetermined threshold may be required for the capacitor 140 to be deemed sufficiently charged by the controller 300. For example, a predetermined threshold may be a minimum percentage for the amount of energy stored to illuminate the LED circuit 130 for 600 milliseconds (ms). If determined that the capacitor 140 is charged, the method 400 proceeds to step 435.

At step 435, the converter 100 is operated in a first mode to couple power to the LEDs. In some embodiments, the first mode corresponds to the first operating mode. As discussed above, the first operating mode supplies power originating from the AC source through the tank circuit 124 compensated with discharged energy from a storage capacitor 140. In alternative embodiments, step 425 may also operate in the third or fourth operating modes to respectively power the lighting LEDs exclusively using rectified power from the AC source or discharged energy from the storage capacitor 140. Step 435 then proceeds back to step 425.

If at step 430, the storage capacitor 140 is determined not to be charged, the method 400 continues to step 4440. At step 440, power is coupled to the lighting LEDs in a second mode.

Figure 5:
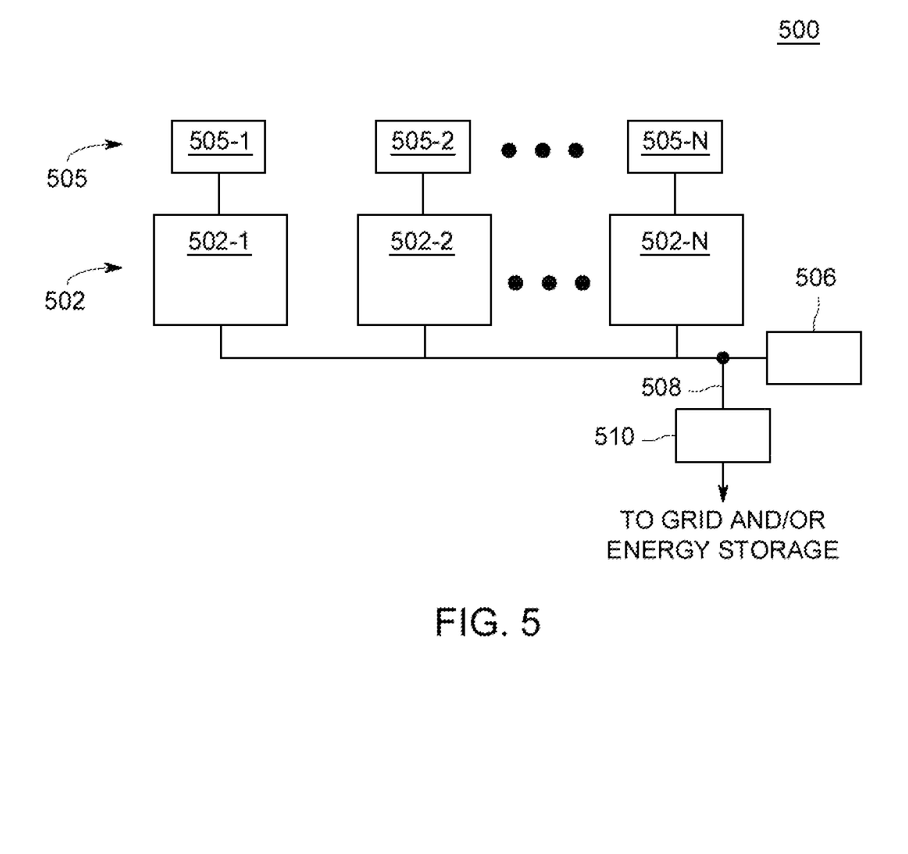
FIG. 5 is a block diagram of a system for LED power conversion comprising one or more embodiments of the present invention.

FIG. 5 is a block diagram of a system 500 for LED power conversion comprising one or more embodiments of the present invention. This diagram only portrays one variation of the myriad of possible system configurations and devices that may utilize the present invention. The present invention can be utilized in any system or device that uses a resonant converter for AC-DC power conversion in LED illumination.

The system 500 comprises a plurality of power converters 502-1, 502-2 . . . 502-N, collectively referred to as power converters 502, a plurality of LEDs 505-1, 505-2 . . . 505-N, are collectively referred to as LEDs 505; a system controller 506; a bus 608; and a load center 510. LEDs 505 may be any suitable LED such as laser, phosphor-based, ultraviolet, high-power, organic LEDs, or the like, for providing a desirable illumination.

Each power converter 502-1, 502-2 . . . 502-N is coupled to a single LED or LED string 505-1, 505-2 . . . 505-N, respectively. In some alternative embodiments, each of the power converters 502 correspond to converters 100 and 200 as described above in FIGS. 1 and 2.

The power converters 502 are coupled to the system controller 506 via the bus 508. The system controller 506 is capable of communicating with the power converters 502 by wireless and/or wired communication (e.g., power line communications) for providing operative control of the power converters 502. The power converters 502 are further coupled to the load center 510 via the bus 508.

The power converters 502 are each capable of converting the received AC power to DC output. The power converters 502 couple the generated AC output power from the grid or energy storage via the bus 508. The generated power may then be distributed for use, for example to one or more appliances, and/or the generated energy may be stored for later use, for example using batteries, heated water, hydro pumping, $H_2O$-to-hydrogen conversion, or the like. In some alternative embodiments, the power converters 502 may be DC-DC power converters.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. An apparatus for light emitting diode (LED) lighting power conversion comprising:
   a full bridge rectifier circuit coupled to a first half-bridge circuit and a resonant tank circuit supplying AC power to a LED circuit and forming a first port to the LED circuit; and
   a second half-bridge circuit and energy storage device receiving and supplying DC power to the LED circuit as determined by a controller to form a second port of the LED circuit,
   wherein the LED circuit further comprises a rectifier circuit for the LED circuit, and at least one LED.

2. The apparatus of claim 1 wherein the second port is bi-directional based on control of the second half-bridge circuit.

3. The apparatus of claim 2, wherein the controller is operative to transition among operating modes wherein the energy storage device is discharged to compensate for the output current from the resonant tank circuit to illuminate the LED circuit.

4. The apparatus of claim 3, wherein the controller further comprises an operating mode to charge the energy storage device with rectified AC power.

5. The apparatus of claim 3, wherein the controller further comprises an operating mode wherein the LED circuit is only illuminated with power from the resonant tank circuit.

6. The apparatus of claim 3, wherein the controller further comprises an operating mode wherein the LED circuit is only illuminated with power from the energy storage device.

7. The apparatus of claim 3, wherein the controller introduces a phase shift in control signals of the first half-bridge circuit and the second half-bridge circuit.

8. The apparatus of claim 2, further comprising voltage and current sampling circuitry operative to monitor rectified AC power to the resonant tank circuit and voltage across the energy storage device to determine when to control the first half-bridge and the second half-bridge to discharge or charge the energy storage device.

9. The apparatus of claim 1, wherein the resonant tank circuit comprises a transformer with a primary winding coupled to the first half-bridge circuit and the second-half bridge circuit, and a secondary winding coupled to the LED circuit.

10. The apparatus of claim 9, wherein the resonant tank circuit further comprises a capacitor coupled in series to the primary winding of the transformer and the secondary winding of the transformer coupled to the LED circuit.

11. The apparatus of claim 1, wherein the first half-bridge circuit comprises at least two switches coupled in parallel operative to control the current flow output from the resonant tank circuit at the first port.

12. A method for light emitting diode (LED) lighting power conversion comprising:
   rectifying an AC power with a full-bridge circuit;
   coupling the rectified AC power to a first half-bridge circuit and a resonant tank circuit;
   supplying current from the resonant tank circuit to a LED circuit and a second half-bridge circuit; and
   operating the first and second half-bridge circuits to selectively charge or discharge an energy storage device coupled across the second half-bridge circuit.

13. The method of claim 12, wherein the switching frequency of the first half-bridge circuit is adjusted to control the amount of current output from the resonant tank circuit.

14. The method of claim 12, wherein the operating further comprises an operating mode wherein the energy storage device is discharged to compensate for the output current from the resonant tank circuit to illuminate the LED circuit.

15. The method of claim 14, wherein the operating further comprises an operating mode to charge the energy storage device with the rectified AC power.

16. The method of claim 12, wherein the operating further comprises an operating mode wherein the LED circuit is only illuminated with power from the resonant tank circuit.

17. The method of claim 16, wherein the operating further comprises an operating mode wherein the LED circuit is only illuminated with power from the energy storage device.

18. The method of claim 12, wherein the operating further comprises introducing a phase shift in control signals of the first half-bridge circuit and the second half-bridge circuit.

19. The method of claim 18, further comprising monitoring the rectified AC power and voltage across the energy storage device to determine when to control the first half-bridge and the second half-bridge to discharge or charge the energy storage device.

* * * * *